May 10, 1960 C. S. STUCKENHOLT 2,936,151
GAS VALVES
Filed May 14, 1957
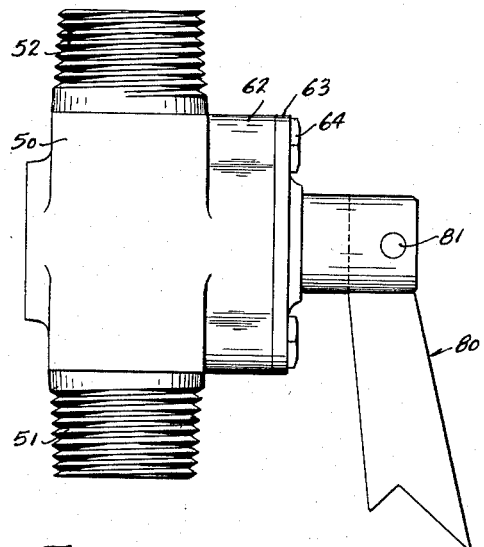
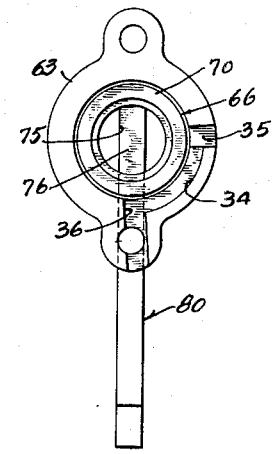
FIG.1.
FIG.3.
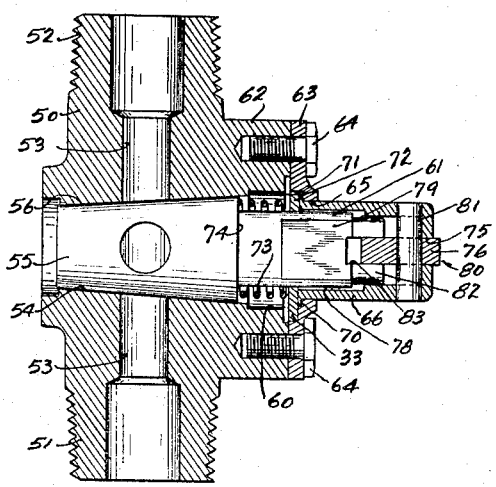
FIG.2.
INVENTOR.
CASPER S. STUCKENHOLT
BY
Bean, Brooks, Buckley v Bean.
ATTORNEYS

United States Patent Office 2,936,151
Patented May 10, 1960

2,936,151
GAS VALVES

Casper S. Stuckenholt, Chagrin Falls, Ohio, assignor to The W. J. Schoenberger Company, Cleveland, Ohio Application May 14, 1957, Serial No. 659,106

2 Claims. (Cl. 251—97)

My invention relates in general to gas valves of the range and heater type.

The principal object of my invention is to provide a valve of this type which will automatically become locked when in its closed position.

Another object is to provide a valve having manually actuated means associated with the valve plug for releasing the locking means.

A further object is to provide an axially movable unlocking means which may be conveniently actuated while grasping the lever handle of the valve.

The above objects and advantages have been accomplished by the device shown in the accompanying drawings, of which:

Fig. 1 is a side elevation of a valve of the invention;

Fig. 2 is a longitudinal sectional view thereof, showing the valve in its closed position; and Fig. 3 is a face view of the lock flange disassembled from the valve body showing the valve handle and unlocking sleeve in position.

Referring now to the form of invention shown in Figs. 1 to 3, 50 is the body of the valve which is provided with a gas inlet portion 51 and a gas outlet portion 52, each formed with a gas passageway 53. The body is formed transversely of the passageway 53 with a tapered bore 54 in which is mounted the plug 55 of the valve. The plug is formed with a tapered periphery 56 which fits the tapered bore of the body. The body is provided at the side having the larger end of the tapered bore with an extension 62 which is formed with a cylindrical bore 60 through which the stem portion 61 of the valve plug is passed.

A lock flange 63 is secured to the extension 62 by any suitable means such as bolts 64. The lock flange is formed with a centrally arranged aperture 65 within which is sildably mounted an unlocking sleeve 66. The sleeve is formed with an annular collar 70 which contacts the inner face of a recess 71 formed in the flange whereby outward movement of the sleeve within the flange is limited. A D-washer 72 is also mounted within the recess 71, and the D-washer and unlocking sleeve are held in their outermost position by means of a spring 73 mounted in the cylindrical bore 60. The spring has its inner end bearing against a shoulder 74 formed on the plug. The D-washer is prevented from turning upon the stem portion by engagement with the flat surface 79 formed on the stem portion.

The unlocking sleeve is formed in its outer end with a diametrically arranged slot 75 within which the upper end 76 of the valve handle 80 is mounted. The handle may be rigidly secured to the sleeve by means of a pin 81 which is passed through the sleeve and handle. The sleeve is formed with a counterbore 78, whereby it may be freely passed over the stem portion 61 of the plug and over a notched portion 82 formed in the outer end thereof. The inner end of the handle extends into the counterbore of the sleeve and is slidably engaged with a diametrically arranged notch 83 formed in the outer end of the notched portion.

The D-washer 72 is formed wih a detent lug 33 (Fig. 2) extending radially from an annular body portion and engageable with an arcuate recess 34 formed in the face of the lock flange 63 (Fig. 3). At one end of recess 34 there is formed a radial detent slot 35 which extends below the surface of the recess 34 but preferably not to the bottom of the annular recess 71 of the flange. The slot 35 is so positioned that it will be engaged by the detent lug 33 when the tapered plug 55 is in its closed position, and the other end 36 of the arcuate slot 34 is engageable with the lug 33 to stop the movement of said plug when in its open position, whereby rotation of said plug will be limited in both directions.

In this form, the D-washer may be dispensed with and a suitable detent corresponding to detent lug 33 formed on the flange of the sleeve, which detent will be disposed within the recess 35 formed in the lock flange when in locked position and will engage the stop 36 when the valve is fully open, in the same manner as detent lug 33.

In operating this form of the invention, it will be obvious that when it is desired to open the valve the handle 80 with this attached unlocking sleeve is pushed inwardly in axial direction against the urge of spring 73, whereby the detent lug 33 of the D-washer or of the sleeve will be released from the notch 35 after which the plug may be freely rotated to its fully open position or to any intermediate position. Obviously, just as soon as the lever handle is moved to close the valve, the detent will automatically snap into engagement with the slot 35 and thereby automatically lock the valve in its closed position. Obviously, when in this latter attitude the plug will be locked in its closed position and can not be accidently moved to its open position.

What is claimed is:

1. A gas valve comprising a body, said body having a tapered axial bore, a tapered plug rotatably mounted within said bore, said plug being formed with an integral stem portion extending exteriorly of said body, said stem portion being formed with a slot opening up in the outer end thereof, a valve handle slip fitted into said slot and adapted to rotate said valve plug, a lock flange secured to said body, an unlocking sleeve slidably mounted upon said stem portion and formed at its inner end with a flange, detent means extending radially from said sleeve, said body being formed with an annular recess for the reception of said detent means, an arcuate recess formed in the inner face of said lock flange for the reception of said detent means, said recess being formed at one end with a stop and at the opposite end with a radial slot, said handle being fixed to said sleeve and being slidably engageable with the slot of said stem portion, and spring means carried by said stem portion and bearing at one end against said tapered plug and at the other end thereof against said detent means, whereby axial movement of said sleeve and handle upon said stem portion will unlock said detent.

2. A gas valve comprising a body, said body having a tapered axial bore, a tapered plug rotatably mounted within said bore, said plug being formed with an integral stem portion extending exteriorly of said body, said stem portion being formed with a slot opening up in the outer end thereof, a valve handle slip fitted into said slot and adapted to rotate said valve plug, a lock flange secured to said body, a sleeve slidably mounted upon said stem portion and formed with a flange at its inner end, a detent lug carried by said sleeve, an arcuate recess formed in the inner face of said lock flange for the reception of said detent lug, said arcuate recess being formed at one end with a stop and at the opposite end with a radial slot, said handle being fixed to said sleeve and slidable within the slot of said stem portion, and spring means carried by said stem portion and bearing against said tapered plug and said sleeve flange, whereby axial movement of said sleeve and handle upon said stem portion will unlock said detent.

References Cited in the file of this patent

UNITED STATES PATENTS

| | | |
|---|---|---|
| 1,714,374 | Jorgensen | May 21, 1929 |
| 2,597,874 | Koch | May 27, 1952 |
| 2,652,226 | Huff | Sept. 15, 1953 |
| 2,723,102 | Mueller | Nov. 8, 1955 |

FOREIGN PATENTS

| | | |
|---|---|---|
| 111,235 | Germany | June 9, 1900 |
| 169,169 | Switzerland | Aug. 1, 1934 |
| 183,314 | Switzerland | Sept. 1, 1936 |
| 158,014 | Germany | Feb. 26, 1940 |
| 492,466 | Italy | Mar. 26, 1954 |